(12) United States Patent
Lu et al.

(10) Patent No.: US 7,861,246 B2
(45) Date of Patent: Dec. 28, 2010

(54) JOB-CENTRIC SCHEDULING IN A GRID ENVIRONMENT

(75) Inventors: Bingfeng Lu, Richmond Hill (CA); Jinsong Zhong, Richmond Hill (CA); Jason Lam, Scarborough (CA)

(73) Assignee: Platform Computing Corporation, Markham, Ontario (CA)

( * ) Notice: Subject to any disclaimer, the term of this patent is extended or adjusted under 35 U.S.C. 154(b) by 1565 days.

(21) Appl. No.: 10/871,286

(22) Filed: Jun. 17, 2004

(65) Prior Publication Data

US 2005/0283782 A1    Dec. 22, 2005

(51) Int. Cl.
G06F 9/46 (2006.01)
G06F 15/16 (2006.01)
G06F 15/173 (2006.01)

(52) U.S. Cl. .................. 718/102; 718/104; 709/201; 709/226

(58) Field of Classification Search ......... 718/100–108; 709/201–203, 223–226
See application file for complete search history.

(56) References Cited

U.S. PATENT DOCUMENTS

| | | | |
|---|---|---|---|
| 3,648,253 A | 3/1972 | Mullery et al. | |
| 4,839,798 A | 6/1989 | Eguchi et al. | |
| 5,031,089 A | 7/1991 | Liu | |
| 5,428,781 A | 6/1995 | Duault et al. | |
| 5,442,791 A | 8/1995 | Wrabetz et al. | |
| 5,473,773 A | 12/1995 | Aman | |
| 5,504,894 A | 4/1996 | Ferguson et al. | |
| 5,522,070 A | 5/1996 | Sumimoto | |
| 5,603,029 A | 2/1997 | Aman et al. | |
| 5,621,663 A | 4/1997 | Skagerling | |
| 5,675,739 A | 10/1997 | Eilert et al. | |
| 5,805,785 A | 9/1998 | Dias et al. | |
| 5,812,844 A | 9/1998 | Jones et al. | |
| 5,822,532 A * | 10/1998 | Ikeda | ......................... 709/224 |

(Continued)

FOREIGN PATENT DOCUMENTS

WO    WO 97/30525    8/1997

(Continued)

OTHER PUBLICATIONS

Czajkowski et al, "A Resource Management Architecture for Metacomputing Systems", Lecture Notes, Springer, 1998, pp. 1-19.*

(Continued)

*Primary Examiner*—Thomas Lee
*Assistant Examiner*—Jennifer N To
(74) *Attorney, Agent, or Firm*—Baker & McKenzie LLP

(57) ABSTRACT

Systems and methods for scheduling jobs in a networked computing grid having job service components for creating jobs having certain resource requirements are described. One embodiment includes resource manager components communicatively linked with the job service components, each resource manager component being configured to manage a plurality of resources. Such a system further includes information components communicatively linked with the job service components and the resource manager components, the information components being configured to aggregate resource data obtained from the resource manager components. The jobs include a scheduling mechanism for querying the information components for resource data, comparing the resource data against the resource requirements and independently scheduling the job to the resource manager components. A resource reservation is also provided for reserving resources for the jobs.

18 Claims, 6 Drawing Sheets

U.S. PATENT DOCUMENTS

| | | | |
|---|---|---|---|
| 5,872,931 | A | 2/1999 | Chivaluri |
| 5,893,905 | A | 4/1999 | Main et al. |
| 5,903,757 | A | 5/1999 | Gretz et al. |
| 5,978,829 | A | 11/1999 | Chung et al. |
| 6,195,676 | B1 | 2/2001 | Spix et al. |
| 6,230,183 | B1 | 5/2001 | Yocom et al. |
| 6,247,041 | B1 | 6/2001 | Krueger et al. |
| 6,263,358 | B1 | 7/2001 | Lee et al. |
| 6,282,561 | B1 | 8/2001 | Jones et al. |
| 6,353,844 | B1 | 3/2002 | Bitar et al. |
| 6,356,917 | B1 | 3/2002 | Dempsey |
| 6,393,455 | B1 | 5/2002 | Eilert et al. |
| 6,412,026 | B1 | 6/2002 | Graf |
| 6,463,454 | B1 | 10/2002 | Lumelsky et al. |
| 6,516,350 | B1 | 2/2003 | Lumelsky et al. |
| 6,523,029 | B1 * | 2/2003 | Kulyukin ............. 707/5 |
| 6,643,614 | B2 | 11/2003 | Ding |
| 6,687,731 | B1 | 2/2004 | Kavak |
| 6,694,345 | B1 | 2/2004 | Brelsford et al. |
| 6,714,960 | B1 | 3/2004 | Bitar et al. |
| 6,728,961 | B1 | 4/2004 | Velasco |
| 7,185,046 | B2 * | 2/2007 | Ferstl et al. .......... 709/201 |
| 7,383,550 | B2 * | 6/2008 | Challenger et al. ...... 719/315 |
| 2003/0126260 | A1 | 7/2003 | Husain |
| 2004/0019624 | A1 | 1/2004 | Sukegawa |
| 2004/0059966 | A1 | 3/2004 | Chan et al. |
| 2004/0064552 | A1 | 4/2004 | Chong |
| 2005/0278441 | A1 * | 12/2005 | Bond et al. .......... 709/223 |
| 2006/0048157 | A1 * | 3/2006 | Dawson et al. ........ 718/104 |

FOREIGN PATENT DOCUMENTS

| | | |
|---|---|---|
| WO | WO 00/041053 | 7/2000 |

OTHER PUBLICATIONS

Brune et al, "Specifying Resources and Services in Metacomputing Environements", Elsevier, Parallel Computing, 1998, pp. 1751-1776.*

International Preliminary Report on Patentability for PCT/IB2005/001712 dated Dec. 20, 2006.

"Specifying and Monitoring Guarantees in Commercial Grids through SLA", HP Labs 2002 Technical Reports, Akil Sahai, Sven Graupner, Vijay Machiraju, and AAD Van Moorsel, Nov. 14, 2002.

"SLA-Driven Management of Distributed Systems Using the Common Information Model", IBM Research Report, Markus Debusmann and Alexander Keller, Aug. 16, 2002.

"Job-Scheduler Exceptions and Alarms", Chapter 4, Platform Job Scheduler User Guide, 2002.

"The Anatomy of the Grid: Enabling Scalable Virtual Organizations", International J. Supercomputer Applications, Ian Foster, Carl Kesselman, and Steven Tuecke, 2001.

"The Physiology of the Grid: An Open Grid Services Architecture for Distributed Systems Integration", Open Grid Service Infrastructure WG, Global Grid Forum, Ian Foster, Carl Kesselman, Jeffrey M. Nick, and Steven Tuecke, Jun. 22, 2002.

"SNAP: A Protocol for Negotiating Service Level Agreements and Coordinating Resource Managment in Distributed Systems", Lecture Notes in Computer Science, K.Czaikowski, I. Forster, C. Kesselman, V. Sander, and S. Tuecke, vol. 2537, pp. 153-183, 2002.

"Agreement-based Grid Service Management (OGSI-Agreement)", Global Grid Forum, K. Czajkowski, A. Dan, J. Rofrano, S. Tuecke, and M. Xu, Jun. 12, 2003.

-unix.globus.org/developer/gram-architecture.html—GT3 GRAM Architecture.

Karl Czajkowski, Steven Fitzgerald, Ian Foster, and Carl Kesselman; "Grid Information Services for Distributed Resource Sharing", Marina del Rey, CA, Northridge, CA, Chicago, IL, Argonne, IL; © 2001 IEEE; pp. 181-194.

Francine Berman, Richard Wolski, Henri Casanova, Walfredo Cirne, Holly Dail, Marcio Faerman, Silvia Figueira, Jim Hayes, Graziano Obertelli, Jennifer Schopf, Gary Shao, Shava Smallen, Neil Spring, Alan Su & Dmitrii Zagorodnov; "Adaptive Computing on the Grid Using AppLeS"; IEEE Transactions on Parallel and Distributed Systems; vol. 14, No. 4; Apr. 2003; pp. 369-382.

Kuan-Wei-Cheng, Chao-Tung Yang, Chuan-Lin Lai, Shun-Chyi Chang; "A Parallel Loop Self-Scheduling on Grid Computing Environments"; Proceedings of the 7th International Symposium on Parallel Architectures, Algorithms and Netowrks (SPAN '04); © 2004 IEEE; pp. 1-6.

J.H. Abawajy, S.P. Dandamudi, "Parallel Job Scheduling on Multicluster Computing Systems", Proceedings of the IEEE International Conference on Cluster Computing (CLUSTER '03); © 2003; pp. 1-8.

International Search Report for PCT/IB2005/001712.

A. Mirtchovski, R. Simmonds, and R. Minnich, "Plan 9—An Intergrated Approach to Grid Computing", http://www.9grid.net/papers/ipdps-04/plan9-grid.pdf.

M. Jones, P. Leach, R. Draves and J. Barrera, "Support for user-centric modular real-time resource managment in the rialto operation system", in Proc. 5th Intl. Workshop on Network and Operating System Support for Digital Audio and Video, Durham, New Hampshire, pp. 55-66, Apr. 1995.

V. Berstis, "Fundamentals of Grid Computing", Redbooks Paper, IBM Corp. 2002. redbooks.ibm.com/redpapers/pdfs/redp3613.pdf.

* cited by examiner

JOB-CENTRIC SCHEDULING IN A GRID ENVIRONMENT

CROSS-REFERENCE TO RELATED APPLICATIONS

This application is related to U.S. patent application Ser. No. 10/871,502, entitled "Goal-Oriented Predictive Scheduling in a Grid Environment" (Inventors: David Bigagli, James Pang, and Shutao Yuan), and U.S. Pat. No. 7,340,654, entitled "Autonomic Monitoring in a Grid Environment" (Inventors: David Bigagli and Xiaohui Wei), each of which were filed on the same day as the present application and each of which are hereby incorporated by reference.

TECHNICAL FIELD

Disclosed embodiments herein relate generally to computing grid environments, and more particularly to improved systems and methods for scheduling jobs in such environments.

BACKGROUND

The increasing complexity of electronic tasks (e.g. executable programs such as computational tasks, command execution, and data collection) has increased the demand for resources used in accomplishing such tasks. Resources may include hardware that aids in completing electronic tasks, such as servers, clients, mainframe computers, networks, network storage, databases, memory, CPU time, and scientific instruments. Resources may also include software, available network services, and other non-hardware resources.

One response to the increased demand for resources has been the development of networked computing grid systems, which operate to integrate resources from otherwise independent grid participants. Computing grid systems generally include hardware and software infrastructure configured to form a virtual organization comprised of multiple resources associated with heterogeneous clusters in often geographically disperse locations.

Electronic tasks, often referred to as "jobs," typically require certain amounts or types of resources for completion. Once a job is created, it must be assigned, or scheduled, to sufficient and compatible resources within the computing grid system. Job scheduling in grid systems has typically been accomplished with a centralized scheduling component deployed within resource management software associated with the grid. With centralized scheduling, jobs do not make any scheduling decisions; rather, scheduling decisions are left to the centralized scheduler, which matches jobs with resources.

Grid environments, and particularly the jobs and resources associated therewith, have become increasingly distributed and dynamic, which has lead to various problems with traditional resource management software. For example, it has been found that increased demand on centralized schedulers has led to the erroneous assignment of jobs to insufficient resources. Additionally, expansive grids may employ different types of resource management software, which can affect the compatibility of jobs with particular resources. In essence, centralized job scheduling mechanisms have become less scalable and less efficient.

Accordingly, improved systems and methods for scheduling jobs in a computing grid system are desired.

BRIEF SUMMARY

Disclosed herein are improved job-centric scheduling systems and related methods of improving job scheduling in computing grid environments. In one exemplary embodiment, a system for performing job-centric scheduling on a computing grid is described as having a job service component for creating a job based on an end-user's request. The job-centric scheduling system further includes a resource manager information component for aggregating resource data for the grid. The resource manager information component obtains resource information from resource managers, which manage the resources provided within clusters of the grid. The job-centric scheduling system allows the job to query the resource manager information component to locate compatible resources within the grid. A plurality of resource manager adapters are provided to enable communication between the job and the resource managers. The resource manager adapters allow the job to access the clusters, which are typically otherwise secured.

In another embodiment, a job-centric scheduling system is described having the aforementioned job service component, resource manager information component, resource managers, and resource manager adapters, and further having a metascheduler for aiding in the job-centric scheduling process. The metascheduler provides the job with scheduling suggestions.

In yet another embodiment, a job-centric scheduling system is described having the aforementioned job service component, resource manager information component, resource managers, and resource manager adapters, and further having a reservation service component for aiding in the job-centric scheduling process. The job may schedule itself to resources within the grid by asking the reservation service component to reserve the appropriate resources.

In other embodiments, any combination of the job service, resource manager information, resource manager, resource manager adapter, metascheduler, and reservation service components may be used in achieving job-centric scheduling.

In still further embodiments, related methods for performing job-centric scheduling in computing grid systems are described.

BRIEF DESCRIPTION OF THE DRAWINGS

Reference is now made to the following descriptions taken in conjunction with the accompanying drawings.

DETAILED DESCRIPTION

The present disclosure relates to a job-centric scheduling system that may be deployed into distributed resource management, or grid, systems. FIGS. 1-4 illustrate an exemplary grid architecture and associated software modules that enable grid participation, whereas the remaining figures disclose the job-centric scheduling systems and related methods of the present disclosure.

Figure 1:
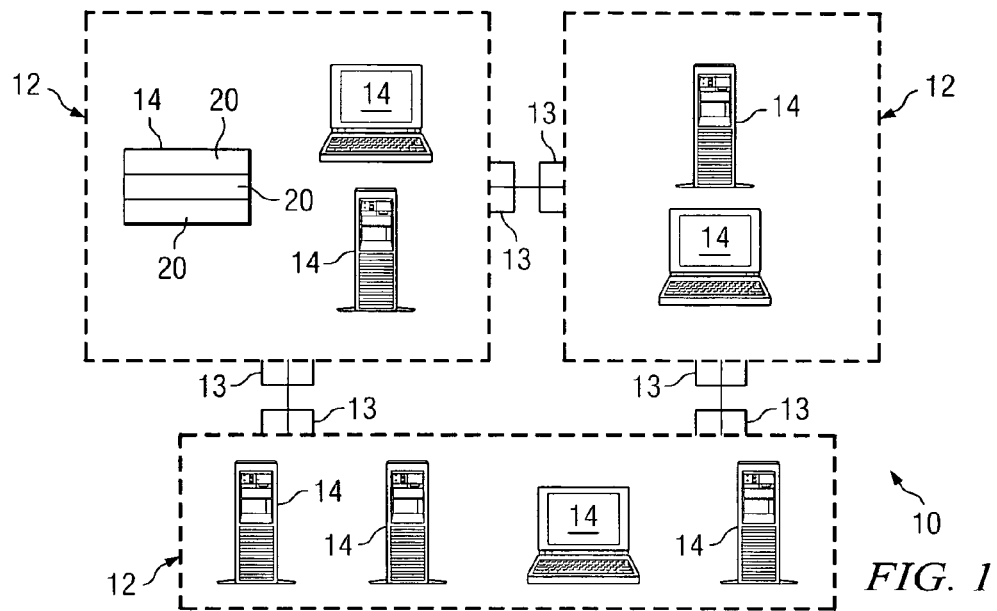
FIG. 1 illustrates a diagrammatic view of a grid system having a plurality of clusters according to one embodiment of the present disclosure.

FIG. 1 illustrates a computing grid 10 having a plurality of clusters 12, which are configured to communicate with one another to share resources across the grid. The clusters 12 generally include a plurality of commonly linked machines, or "hosts" 14, which are enabled to provide resources such as CPU time, database storage, and computing capabilities. Each cluster 12 is typically protected by a firewall 13, which provides security for the networked hosts 14 within the cluster. A host 14 may be any machine capable of providing resources, such as a personal computer (PC), a server, or other computing device known in the art. Resources on a particular host 14 may be divided into slots 20, which generally refer to certain amounts of electronic task capacity available on the host 14. By breaking down the task capacity into slots 20, the scalability of the grid 10 can be increased, thereby increasing the resources available on the grid.

Grid systems, such as the grid 10, are typically built by configuring each cluster 12 to facilitate resource sharing on the grid. Such configuration may occur by loading grid-enabling software onto the hosts 14 or other devices associated with the clusters 12. In doing so, the operating system services provided by the hosts 14 are extended to create a single system image for the cluster 12. The grid-enabling software of the present disclosure may be in the form of simple object access protocol (SOAP/XML protocol) and may be configured to support operating systems such as Linux®, Windows® and Unix® by deploying software daemons that run on the preexisting operating systems provided for the cluster 12. The grid-enabling software may be broken down into various software modules, which include various processes for facilitating operation of the grid 10.

Figure 2:
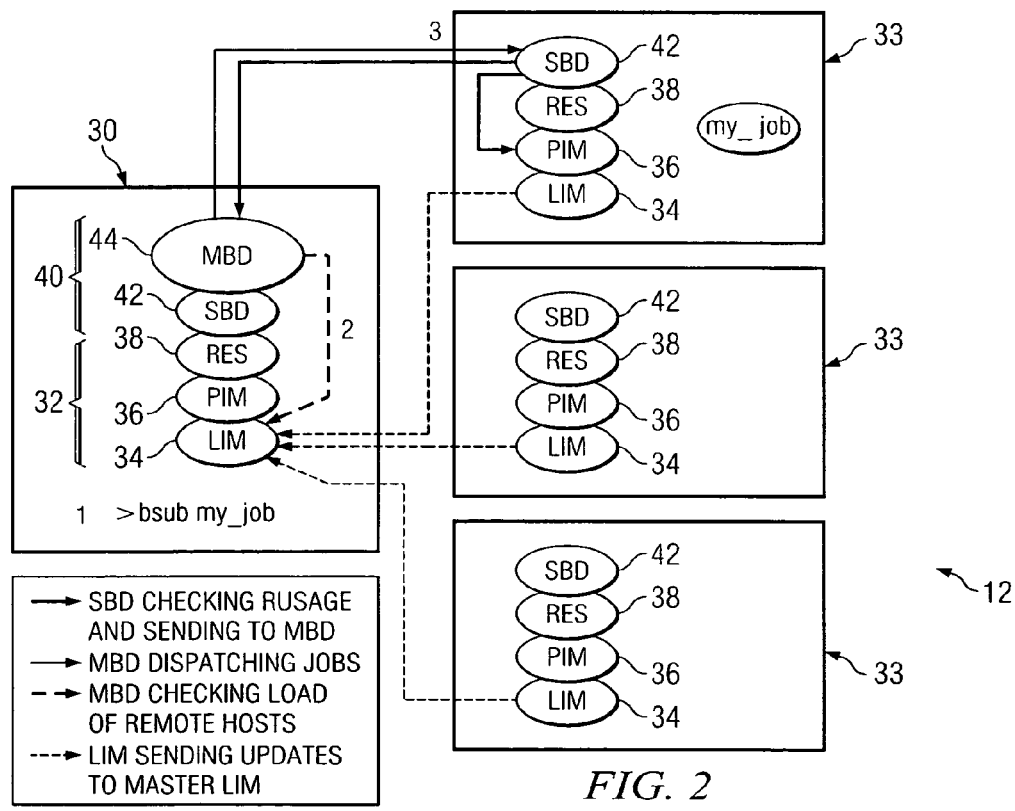
FIG. 2 illustrates an architecture associated with the clusters of the grid system of FIG. 1.

Referring now to FIG. 2, within the cluster 12 the grid-enabling software may be initially loaded onto a master host 30 selected for the cluster 12. The master host 30 may be a selected host 14 associated with the cluster 12, and is typically the host associated with an administrator of the cluster (hereinafter "system administrator"). The software may be built in layers, beginning with a base system 32. The base system 32 generally provides dynamic load balancing and transparent access to resources available within the cluster 12. The base system 32 includes a load information manager (LIM) component 34, which collects resource information from slave hosts 33 within the cluster 12 as will be further described. As with the master host 30, the slave hosts 33 may be any hosts 14 within the cluster 12. The base system 32 further includes a process information manager (PIM) component 36, which gathers process information such as configuration data. Upon startup, the load information manager 34 may read configuration data compiled on the process information manager 36. The base system 32 also includes a remote execution server (RES) 38, which is responsible for executing jobs remotely and transparently within the cluster 12.

A batch system 40 is then loaded as a layer on top of the base system 32, and includes a slave batch daemon 42 and a master batch daemon 44. The slave batch daemon 42 includes processes for receiving and processing instructions provided by the master batch daemon 44. The master batch daemon 44 is a level higher than the slave batch daemon 42, and is configured to manage not only the slave batch daemon 42 of the master host 30, but each of the slave batch daemons associated with the plurality of slave hosts 33. Although only three slave hosts 33 are shown, the number of hosts associated with the cluster 12 can vary considerably.

Grid-enabling software is also deployed onto the slave hosts 33 to facilitate resource sharing on the grid 10. In particular, the base system 32 of the grid software is loaded onto the slave hosts 33. As such, the slave hosts 33 are configured with their own load information managers 34, process information managers 36 and remote execution servers 38. Additionally, the slave hosts 33 are provided with their own slave batch daemons 42, which receive instructions from the master batch daemon 44 and facilitate the execution of the jobs (via the remote execution server 38) that are sent to the particular hosts.

Upon installation, the master batch daemon 44 can check the configuration of the cluster 12 and contact each of the slave batch daemons 42 of the slave hosts 33 to initiate host updates to the load information manager 34 of the master host 30. The host updates may be provided by the load information managers 34 of the slave hosts 33 and sent to the load information manager 34 of the master host 30, thereby aggregating resource data for the cluster 12.

Figure 3:
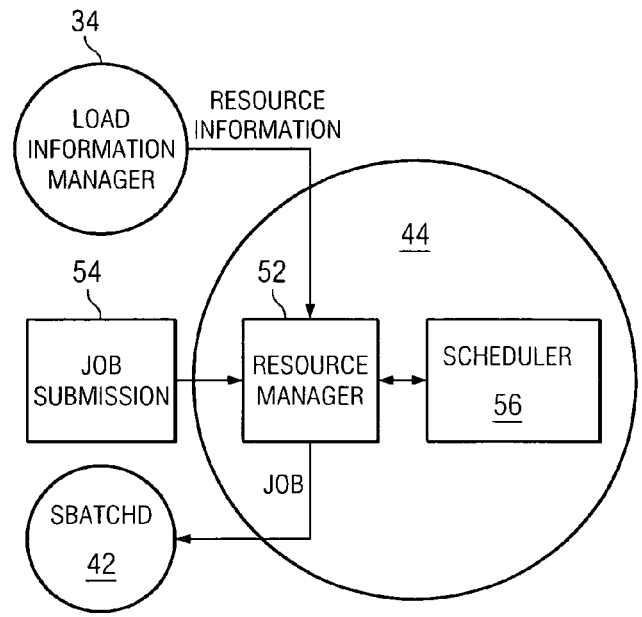
FIG. 3 illustrates processes associated with a component of the architecture of FIG. 2.

Referring now to FIG. 3, the master batch daemon 44 includes processes for generally functioning as a cluster workload, or resource, manager 52. For example, the resource manager 52 may allocate the collection of resources associated with the cluster 12 and match such resources with the resource requirements associated with a particular job to be executed on the grid 10. Accordingly, the resource manager 52 implemented within the master batch daemon 44 can receive job submissions 54 and transmit such jobs to slave batch daemons 42, which execute the jobs. In this manner, the master batch daemon 44 effectively enforces scheduling policies associated with the grid 10 as will be further described. Scheduling policies are typically driven by the requirements of particular jobs to be executed on the grid 10.

In some embodiments, a scheduler 56 is associated with the master batch daemon 44 and is configured to facilitate job scheduling within the cluster 12. In particular, the scheduler 56 is provided to assign job to a host or hosts within the cluster 12 according to a scheduling decision made by the job as will be further described.

Figure 4:
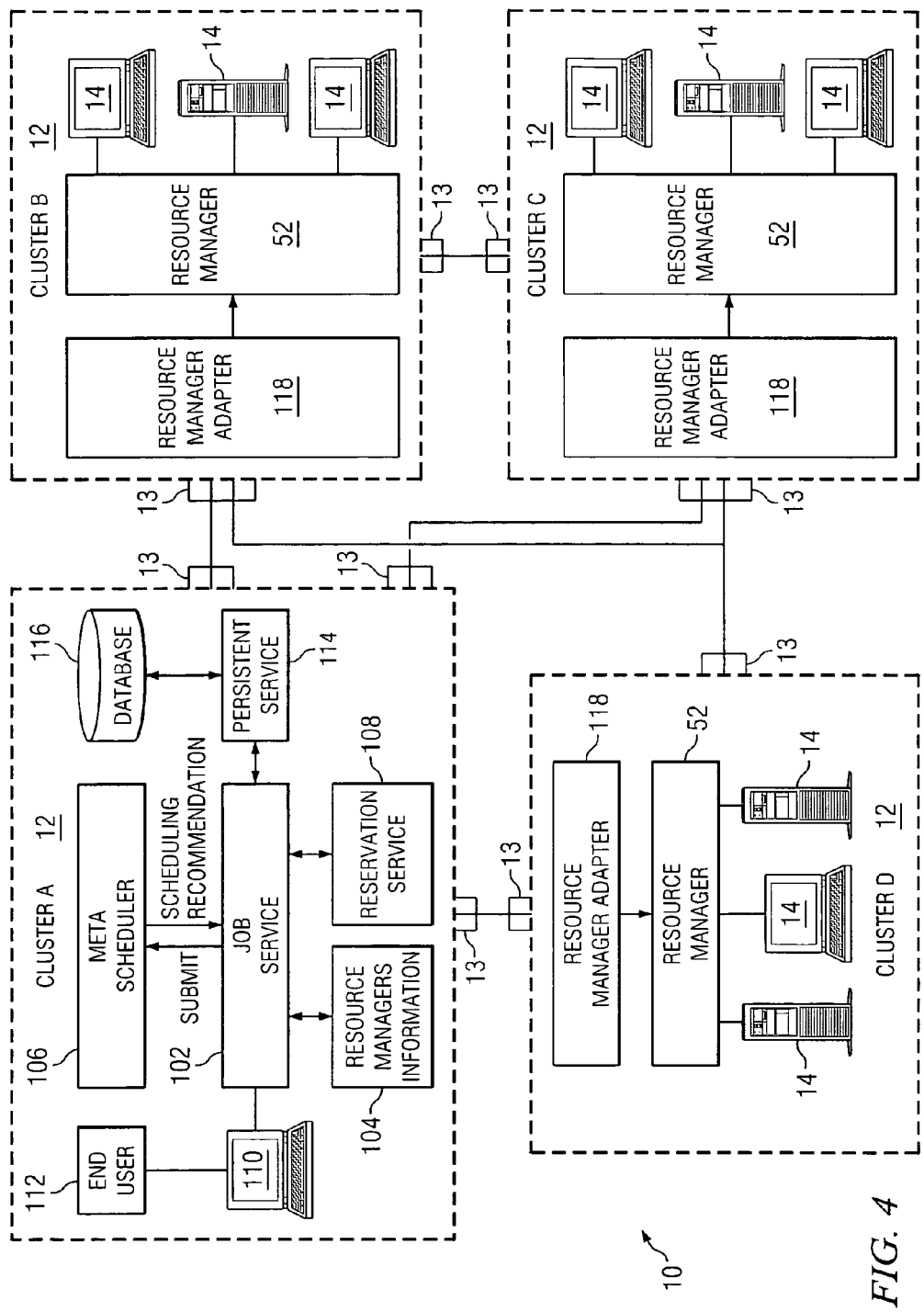
FIG. 4 illustrates a modified diagrammatic view of the grid system of FIG. 1.
Figure 5:
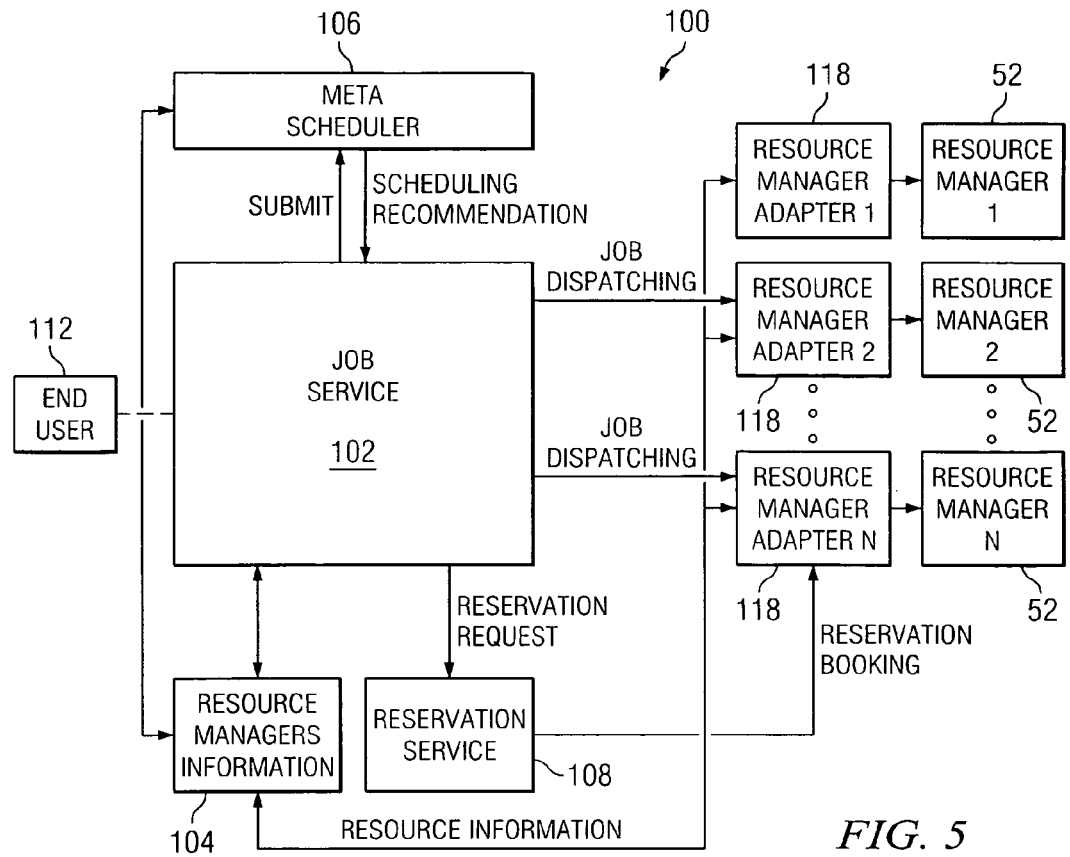
FIG. 5 illustrates a diagrammatic view of a job-centric scheduling system according to one embodiment of the present disclosure.

FIGS. 4 and 5 illustrate a job-centric scheduling system 100 for deployment within the computing grid environment 10 according to one embodiment of the present disclosure. The system 100 includes several modules, or components, which may be implemented into computing grid systems as programming abstractions in a software format.

Referring to FIG. 4, the system 100 is deployed into the grid 10, which is illustrated to include a plurality of clusters 12 (Clusters A, B, C, and D). A portion of the job-centric scheduling system 100 may be deployed into Cluster A to include a job service component 102, a resource manager information component 104, a metascheduler component 106, and a reservation service component 108, each of which may be deployed onto any machine associated with Cluster A, such as a PC 110 associated with an end-user 112. Additionally, Cluster A may include a persistent service component 114, which is generally configured as a fault tolerance mechanism, and in some embodiments, supports the job service component 102 to ensure that data is not lost during job execution. For example, during job execution, the persistent service component 114 may continually download job data to an associated database 116. Therefore, should a host 14 fail during job execution, job data can be recovered from the database 116. The database 116 may be any commercial database such as an XML database. Moreover, the persistent service component 114 generally provides backup services at the grid level. Accordingly, deployment of the persistent service component 114 is not limited to a particular cluster. Rather, additional persistent service components 114 may be deployed into other portions of the grid 10, including Clusters B, C, and D.

The job-centric scheduling system 100 may further include a plurality of resource manager adapters 118 and associated resource managers 52, which are deployed into the Clusters B, C, and D. Clusters B, C, and D also include a plurality of hosts 14 for providing resources. Although not shown, Cluster A may also include a resource manager adapter 118 and a resource manager 52. Additionally, the portion of the job-centric scheduling system 100 shown as deployed into Cluster A may also be deployed into Clusters B, C, and D.

Referring now to FIG. 5, the job-centric scheduling system 100 is illustrated in block diagram format to simplify the following explanation of the components of the system. The job service component 102 generally provides an interface for inputting jobs into the grid 10. The job service component 102 comprises software processes configured to receive input from the end-user 112 and create a job based on the end-user's request. The grid 10 may include one or several job service components 102, depending on the particular parameters of the grid. In some embodiments, jobs input into the grid 10 will have predetermined resource requirements, e.g., two Linux® servers with over 2 gigabytes of memory, and thus the job can immediately begin the scheduling process to find the proper resources for carrying out its task as will be further described. Additional resources may become available after the beginning of the scheduling process, and the job-centric scheduling system 100 may also be configured to adapt the job allocation according to those additional available resources.

The resource manager adapters 118 are provided to enable communication between the clusters (e.g. Clusters A, B, C, and D) associated with the grid 10. For example, the resource manager adapters 118 may be provided to enable communication between jobs created by the job service component 102 and the resource managers 52. To enable communication, the resource manager adapters 118 may include abstractions for mapping from the grid to a security model of a particular resource manager and/or mapping the resource specification language of the job to the resource manager's resource requirement syntax. In some embodiments, the resource manager adapters 118 may comprise a Java® application programming interface (API) and a simple object access protocol (SOAP) interface, thereby permitting cross-cluster communication. However, generally speaking, the resource manager adapters 118 are adapted to receive job requests, translate the job requests into resource manager-specific requests, and send the requests to the corresponding resource manager 52. Although shown as being in a one-to-one ratio with the resource managers 52, several resource manager adapters 118 may be communicatively linked with a single resource manager 52 or a single resource manager adapter 118 may link to multiple resource managers 52.

The resource managers 52 of the job-centric scheduling system 100 submit resource information to the resource manager information component 104, which systematically aggregates the resource information provided by the resource managers. Resource information generally includes resource usage information and availability information. However, the content of the information provided to the resource manager information component 104 may be simple or comprehensive. For example, in some instances, resource information may simply include the name and location of each resource manager 52. Alternatively, the resource information provided to the resource manager information component 104 may include additional information such as the number and types of hosts in each cluster 12 and the speed, memory, swap and disk space associated with the hosts 14.

Resource information may additionally include job-related information such as the number of running jobs, pending jobs, and suspended jobs at the particular cluster 12. Moreover, average job turnaround time and the average job waiting time may also be provided. Job-related information may be provided in queues, which are often utilized by resource managers 52 for resource matching and scheduling policy customization.

Resource information can be stored in any format and in any suitable storage mechanism such as a plain file, an SQL database and an XML database. Moreover, one or several resource manager information components 104 may be incorporated into the grid 10 and communicatively linked with particular job service components 102 and resource managers 52.

The jobs created by the job service component 102 query the resource manager information component 104 to determine which resource managers 52 may be compatible with the job's resource requirements. The resource manager information component 104 may either extract resource information from the resource managers 52, or alternatively, the resource managers may periodically publish their resource information to the resource manager information component.

In addition, the resource managers 52 may define cluster-level access control policies, which define how end-users 112 can access resources in the clusters. Such policies may include limitations on which end-users can access the clusters 12, when end-users can access the clusters 12, and the number of jobs that can be executed on the clusters 12 by particular end-users. Accordingly, over-consumption of resources by particular end-users 112 may be avoided.

The job-centric scheduling system 100 may include additional components such as the metascheduler component 106 and the reservation service component 108. Jobs can query the metascheduler 106 and/or the reservation service 108 when scheduling itself on the grid 10. When provided, the metascheduler 106 is communicatively linked with at least the job service component 102 and the resource manager information component 104, and provides an additional avenue for scheduling jobs by providing the jobs with scheduling suggestions. In particular, the metascheduler 106 can communicate with several resource manager information components 104 and base scheduling decisions on such communications. However, scheduling decisions reached by the metascheduler 106 can either be accepted or rejected by individual jobs. For example, jobs may have defined scheduling standards such as run time and queue time, which might affect whether or not the job accepts the scheduling decisions of the metascheduler 106.

The reservation service 108 provides yet another alternative option for job scheduling. In some situations, such as time-sensitive applications, it may be desired to reserve resources associated with certain resource managers 52 in order to guarantee that the resources will be available at a specified time and date. Reservations can be host-specific, or in other cases, more general in nature such as requiring a specific resource-type on a specific day. In some embodiments, the reservation service 108 does not limit a job from making multiple reservations. Additionally, multiple jobs may use the same reservation.

Figure 6:
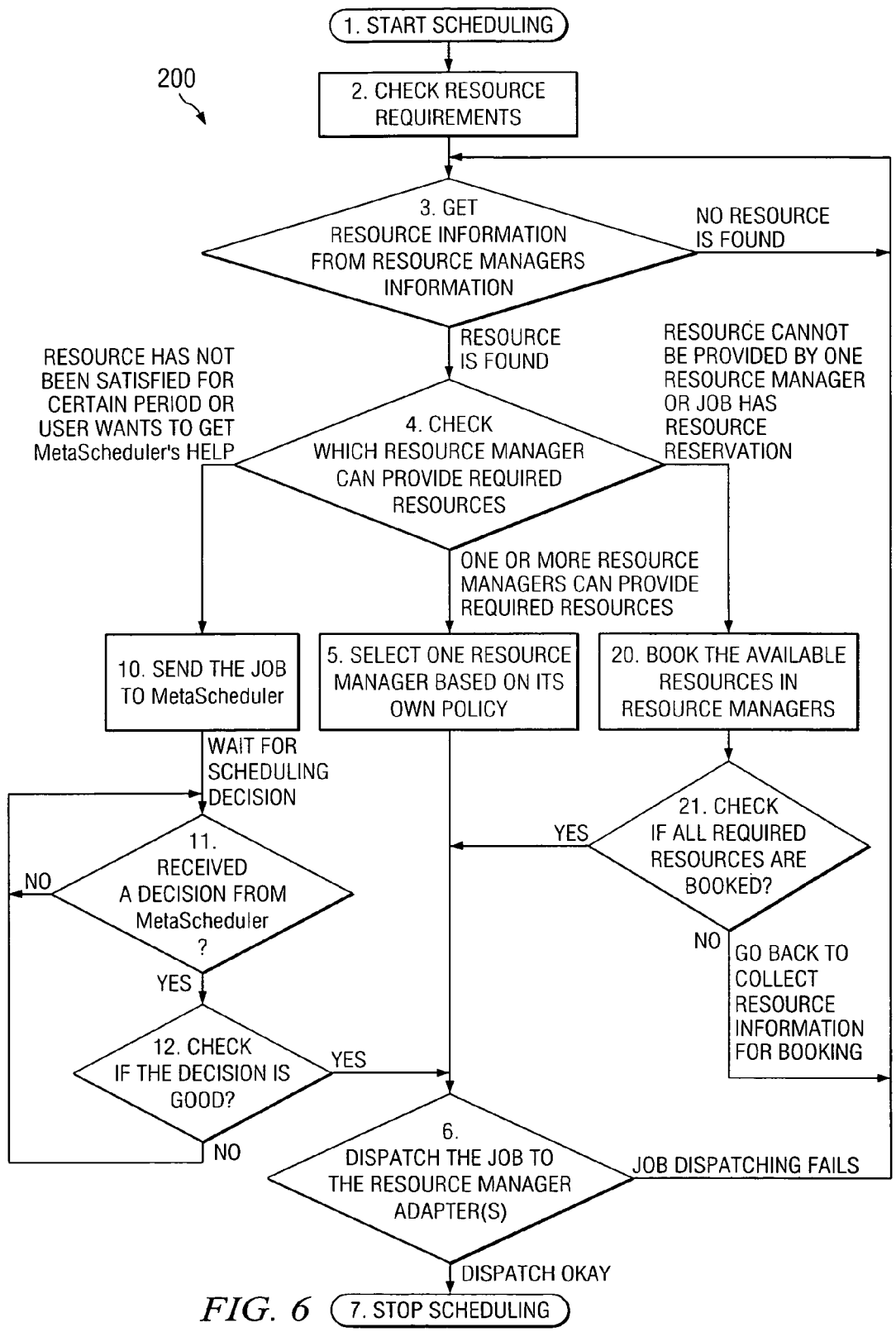
FIG. 6 illustrates a diagrammatic view of a job-centric scheduling algorithm associated with the system of FIG. 5.

Having generally described the job-centric scheduling system 100, attention will now be given to a job-centric scheduling algorithm for job-centric scheduling according to the present disclosure. FIG. 6 illustrates a job-centric scheduling algorithm 200, which depicts an exemplary manner of carrying out job-centric scheduling. Prior to execution of the algorithm 200, an end-user submits a job request having specified resource requirements to the job service component 102, which then creates a corresponding job. For sake of clarity, the job created by the job service component 102 and subject to the algorithm 200 will be generally referred to as "Job J." Upon creation, Job J begins scheduling itself as represented by algorithm 200.

In some instances, rather than leaving the resource assignment to the scheduling mechanism, the end-user may specify the preferred resource manager 52, the preferred resource manager adapter 118 or the preferred resource reservation service 108, thereby obviating the need for Job J to schedule itself. In such cases, Job J merely validates the user-specified resource manager 52, resource manager adapter 118 or resource reservation service 108, and dispatches itself to the corresponding resource manager adapter 118 for execution.

If no user resource preferences are specified, job scheduling is executed generally as follows:

(1)—Job J begins scheduling.

(2)—Job J checks the user-specified resource requirements.

(3)—Job J queries some or all of the resource manager information components 104 with which the job is communicatively linked. If resources are found, then Job J will go to (4). If no resources are found, Job J will wait for a predetermined time period and retry.

(4)—Job J compares the resources found at each resource manager information component 104 with its own resource requirements. Based on the results, Job J will go to (5), (10) or (20).

(5) If one resource manager 52 can provide all the required resources, Job J will set its execution destination to the compatible resource manager and prepare for dispatch. If more than one resource manager 52 is compatible, Job J can select a desired resource manager, or in some embodiments, the job may use multiple resource managers 52 to obtain the resources for the job.

(6)—Job J is dispatched to the resource manager adapter 118 corresponding to the chosen resource manager 52.

(7)—Job J waits for a dispatching response from the resource manager 52 via the resource manager adapter 118. If Job J is dispatched successfully, the job stops scheduling and waits for a job status update from the resource manager 52. If the dispatch is unsuccessful, Job J will go back to (3) and reschedule itself accordingly.

(10)—If the resource comparison of (4) results in the end-user preferring to use the metascheduler 106 to schedule Job J or the resource requirements cannot be met by any of the resource managers 52, the job will submit itself to the metascheduler. In some embodiments, Job J will submit itself to multiple metaschedulers 106.

(11)—Job J waits for scheduling decisions from the metascheduler 106. Although not shown, Job J can optionally go back to (3) if no decision is made within a certain time period.

(12)—Upon receiving a scheduling decision, Job J will check the decision against its preferences. If the scheduling decision is acceptable, Job J will go to (6) to be dispatched. If the scheduling decision is not acceptable, Job J will reject the decision and will wait for other scheduling decisions. If none of the scheduling decisions are acceptable, Job J may go back to (3) to restart the scheduling process.

(20)—Job J requests a reservation service to book resources in resource managers 52 via resource manager adapters 118. As multiple jobs may request the same resources, Job J awaits the response from its own reservation request. Upon confirmation by the resource manager 52, the resources will be reserved for Job J.

(21)—If the resources are successfully booked, Job J checks if all the required resources have been successfully reserved. If yes, Job J will go to (6) to be dispatched. Otherwise, Job J will go back to (3) to restart the rescheduling process.

Some of the above actions of the algorithm 200 may be eliminated, additional actions may be added, or the actions may be otherwise altered without departing from the scope of this disclosure. Exemplary manners of job-centric scheduling according to the present disclosure will now be described.

Example A

Job-Centric Direct Scheduling

Figure 7:
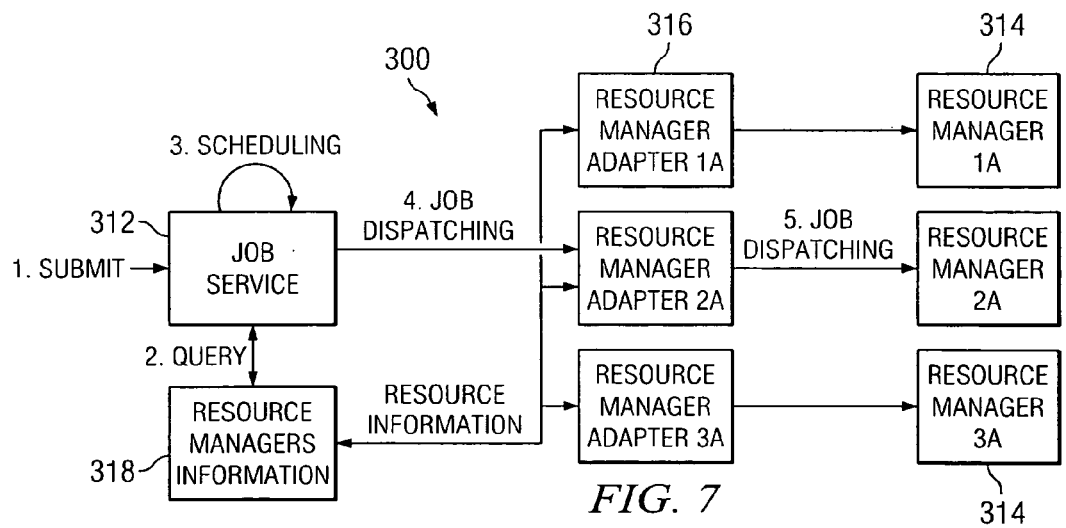
FIG. 7 illustrates a diagrammatic view of a job-centric scheduling method according to one embodiment of the present disclosure.

FIG. 7 illustrates a job-centric scheduling system 300 for performing job-centric scheduling. The job-centric scheduling process begins with the submission of a job request (action 1) to a job service component 312, which creates Job A. In this example, Job A requires user-specified resources of four Linux® servers with a cumulative memory of at least 5 gigabytes. Upon creation, Job A queries a resource manager information component 318 in the system 300 (action 2) to obtain resource information on various resource managers 314 in the system, particularly Resource Managers 1A, 2A, and 3A.

Job A determines that Resource Manager 2A has the appropriate resources to execute Job A. Accordingly, Job A schedules itself (action 3) to Resource Manager 2A. Job A then dispatches itself (action 4) to a resource manager adapter 316 (Resource Manager Adapter 2A) associated with Resource Manager 2A. Resource Manager Adapter 2A translates and sends Job A (action 5) to Resource Manager 2A for execution.

As described above, Example 1 relates to scheduling jobs in a grid environment without the use of a centralized scheduler, a metascheduler or a reservation service.

Example B

Job-Centric Scheduling Through a Reservation Service

Figure 8:
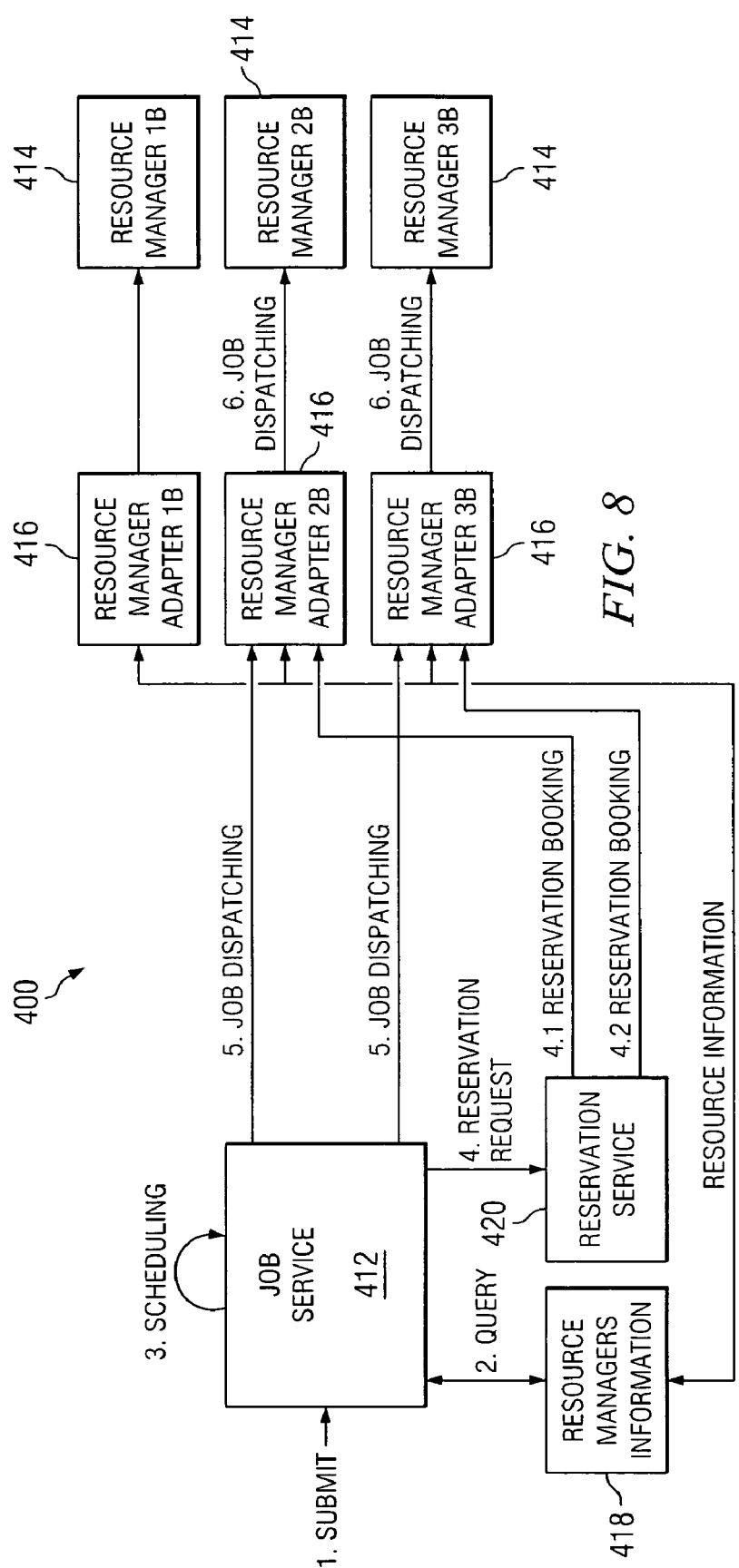
FIG. 8 illustrates a diagrammatic view of a job-centric scheduling method according to another embodiment of the present disclosure.

FIG. 8 illustrates a job-centric scheduling system 400 for performing job-centric scheduling. The job-centric scheduling process begins with the submission of a job request (action 1) to a job service 412, which creates Job B. In this example, Job B requires user-specified resources of 128 Linux® processors. Upon creation, Job B queries a resource manager information component 418 (action 2) in the system 400 to obtain resource information on various resource managers 414 in the system, particularly Resource Managers 1B, 2B, and 3B.

Job B schedules itself (action 3) based on information collected from the resource manager information component 418. In particular, Job B determines that Resource Managers 2B and 3B each include the appropriate type of processors, but not the requisite number of processors. However, combining the resources of Resource Managers 2B and 3B will yield a sufficient amount of processors. Accordingly, Job B sends a reservation request (action 4) to a reservation service 420 in the system 400. The reservation service 420, in turn, sends the reservation request (actions 4.1 and 4.2) to a pair of resource manager adapters 416 (Resource Manager Adapters 2B and 3B) corresponding to Resource Managers 2B and 3B. The Resource Manager Adapters 2B and 3B respond as having reserved the following resources—80 Linux® processors from Resource Manager 2B and 48 Linux® processors from Resource Manager 3B. The reservation service 420 then notifies Job B that the requisite processors have been successfully booked.

Job B then dispatches itself (action 5) to the Resource Manager Adapters 2B and 3B, which translates and sends Job B (action 6) to the corresponding Resource Managers 2B and 3B for execution.

Example 2 does not require a centralized scheduler or a metascheduler for the scheduling of jobs in the system 400.

Example C

Job-Centric Scheduling Through a Metascheduler

Figure 9:
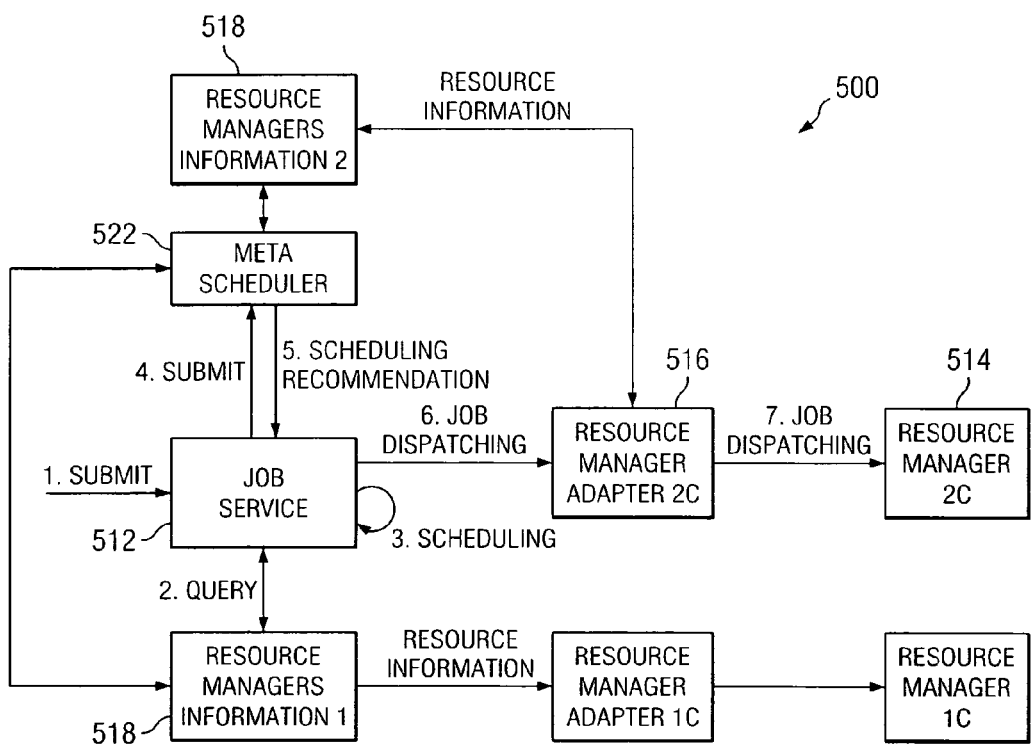
FIG. 9 illustrates a diagrammatic view of a job-centric scheduling method according to yet another embodiment of the present disclosure.

FIG. 9 illustrates a job-centric scheduling system 500 for performing job-centric scheduling. The job-centric scheduling process begins with the submission of a job request (action 1) to a job service 512, which creates Job C. In this example, Job C requires user-specified resources of two Cray® machines. Upon creation, Job C queries a resource manager information component 518 (action 2) in the system 500 to obtain resource information on a resource manager 514 associated with resource manager information component 518, particularly Resource Manager 1C. Job C then schedules itself (action 3) based on the information collected from the resource manager information component 518. However, Job C determines that Resource Manager 1C cannot provide two Cray® machines as needed for execution of Job C.

Job C submits itself to a metascheduler 522 (action 4) associated with the system 500 in order to seek scheduling suggestions. The metascheduler 522 proceeds to collect resource information (action 5) from Resource Manager 1C and an additional resource manager 514, particularly Resource Manager 2C. As shown, the metascheduler 522 may query an additional resource manager information component 518 (Resource Managers Information 2) to collect resource information on Resource Manager 2C. The metascheduler 522 finds that Resource Manager 2C has two Cray® machines and notifies Job C that Resource Manager 2C has the requisite resources for executing Job C. Job C then dispatches itself (action 6) to a resource manager adapter 516 (Resource Manager Adapter 2C), which translates and sends Job C to Resource Manager 2C for execution (action 7). Job scheduling in Example C does not require a centralized scheduler or a reservation service.

Each of the above three examples demonstrate that job-centric scheduling according to the present disclosure is self-driven, or job-centric, in that individual jobs seek to locate resources within a particular grid, rather than assigning such a task to a centralized scheduler. Moreover, job scheduling according to the present disclosure may be accomplished in any combination of direct scheduling (example A), scheduling through a reservation request (example B), or scheduling through a metascheduler (example C). As such, job-centric scheduling processes combining various features of direct scheduling, reservation scheduling and/or metascheduler scheduling are intended as being within the scope of the present disclosure.

Moreover, job-centric scheduling according to the present disclosure may be utilized in any type of computing grid system, including simple grids having homogeneous systems and more complex grids having heterogeneous systems. Furthermore, job-centric scheduling may incorporate various aspects of parallel job execution, such as breaking the job into a plurality of sub-jobs each having an independent scheduling mechanism. Still further, a variety of communication systems may be implemented into a computing grid system having job-centric scheduling. For example, it may be necessary for sub-jobs to communicate with one another. In such instances, the open standard Message Passing Interface (MPI) and any variation thereof may be provided to facilitate such communication.

While various embodiments of job-centric scheduling systems according to the principles disclosed herein, and related methods of performing job-centric scheduling, have been described above, it should be understood that they have been presented by way of example only, and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A system for scheduling jobs in a networked computing grid having one or more job service components for creating one or more jobs comprising executable program code and having certain resource requirements for completing an electronic task, comprising:

a plurality of resource manager components deployed in at least one cluster in the networked computing grid and communicatively linked with the one or more job service components deployed in at least one cluster in the networked computing grid, each resource manager component being configured to manage a plurality of resources provided by a plurality of host machines associated with the networked computing grid; and one or more information components deployed in at least one cluster in the networked computing grid and communicatively linked with the one or more job service components and the plurality of resource manager components, the one or more information components being configured to aggregate resource data obtained from the plurality of resource manager components;

wherein the one or more jobs are created by corresponding ones of the one or more job service components to further include a scheduling mechanism in their program code for querying the one or more information components for resource data, comparing the resource data against the resource requirements and independently scheduling the one or more jobs to one or more of the plurality of resource manager components.

2. The system of claim 1 further comprising a plurality of resource manager adapter components deployed in at least one cluster in the networked computing grid and associated with the plurality of resource manager components, the resource manager adapter components being provided to enable communication between the one or more jobs and the plurality of resource manager components.

3. The system of claim 1 further comprising a metascheduler component deployed in at least one cluster in the networked computing grid and communicatively linked with the one or more job service components and the one or more information components, the metascheduler component being configured to provide scheduling suggestions to the one or more jobs.

4. The system of claim 1 further comprising a reservation service component deployed in at least one cluster in the networked computing grid, the reservation service component being configured to receive a reservation request from the one or more jobs and reserve resources according to the reservation request.

5. The system of claim 1 further comprising a persistent service component deployed in at least one cluster in the networked computing grid and an associated database deployed in at least one cluster in the networked computing grid, the persistent service component being configured to download job data to the associated database and recover job data from the associated database.

6. A method for scheduling a job in a networked computing grid, the job comprising executable program code and having certain resource requirements for completing an electronic task, the method comprising:

providing a plurality of resources within the networked computing grid;

providing one or more resource manager components for managing one or more of the plurality of resources;

providing one or more information components in communication with the one or more resource manager components, the one or more information components being operable to aggregate resource data obtained from the one or more resource manager components;

enabling the job in its program code to schedule itself to one or more of the plurality of resources, wherein enabling the job comprises enabling the job to query the one or more information components and evaluate whether one or more of the plurality of resources is compatible with the resource requirements of the job; and scheduling the job via its program code to the one or more of the plurality of resources based on the evaluation.

7. The method of claim 6 wherein the resource data is obtained by configuring the one or more information components to extract resource data from the one or more resource manager components.

8. The method of claim 6 wherein the resource data is obtained by configuring the one or more resource manager components to submit resource data to the one or more information components.

9. The method of claim 6 wherein the resource data is obtained by configuring the one or more information components to extract resource data from the one or more resource manager components and configuring the one or more resource manager components to submit resource data to the one or more information components.

10. The method of claim 6 wherein the job evaluates whether one or more of the plurality of resources is compatible according to a scheduling algorithm.

11. The method of claim 6 further comprising providing a plurality of resource manager adapter components associated with the one or more resource manager components, the resource manager adapter components enabling communication between the job and the plurality of one or more resource manager components.

12. The method of claim 11 wherein one of the resource manager adapter components and one of the associated resource manager components are deployed into a first cluster, wherein the job originates from a second cluster different than the first cluster, and wherein enabling the job comprises enabling the job to communicate with the one of the resource manager components through the one of the resource manager adapter components.

13. The method of claim 11 further comprising providing a metascheduler component, wherein enabling the job comprises enabling the job to query the metascheduler component for scheduling suggestions.

14. The method of claim 11 further comprising providing a reservation service component, wherein enabling the job comprises enabling the job to query the reservation service component to reserve one or more of the plurality of resources.

15. A method for scheduling a job comprising executable program code and having certain resource requirements for completing an electronic task within a networked computing grid having a plurality of resources, the method comprising:

providing a plurality of resource manager components for managing the plurality of resources associated with the networked computing grid;

aggregating resource data obtained from the resource manager components;

enabling the job in its program code to query the resource data to evaluate whether one or more of the plurality of resources is compatible with the resource requirements of the job; and scheduling the job via its program code to one or more of the plurality of resources determined to be compatible with the resource requirements of the job via communication between the job and one or more of the plurality of resource manager components associated with the one or more of the plurality of resources determined to be compatible.

16. The method of claim 15 further comprising enabling communication between the job and the one or more of the plurality of resource manager components by providing a plurality of resource manager adapter components communicatively linked with the plurality of resource manager components.

17. The method of claim 15 further comprising providing a metascheduler component, and enabling the job to query the metascheduler for scheduling suggestions.

18. The method of claim 15 further comprising providing a reservation service component, and enabling the job to query the reservation service component to reserve one or more of the plurality of resources within the networked computing grid.

* * * * *